United States Patent
Chang (10) Patent No.: US 12,523,705 B2
(45) Date of Patent: Jan. 13, 2026

(54) BATTERY APPARATUS AND CURRENT SENSOR DIAGNOSIS METHOD

(71) Applicant: LG Energy Solution, Ltd., Seoul (KR)

(72) Inventor: Hoyun Chang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1147 days.

(21) Appl. No.: 17/439,043

(22) PCT Filed: Jan. 12, 2021

(86) PCT No.: PCT/KR2021/000403
§ 371 (c)(1),
(2) Date: Sep. 14, 2021

(87) PCT Pub. No.: WO2021/167247
PCT Pub. Date: Aug. 26, 2021

(65) Prior Publication Data
US 2022/0155376 A1    May 19, 2022

(30) Foreign Application Priority Data
Feb. 17, 2020  (KR) .................. 10-2020-0019229

(51) Int. Cl.
*G01R 31/382*    (2019.01)
*G01R 19/10*     (2006.01)
(Continued)

(52) U.S. Cl.
CPC ........... *G01R 31/382* (2019.01); *G01R 19/10* (2013.01); *H01M 10/482* (2013.01); *H01M 50/512* (2021.01); *H02J 7/0013* (2013.01)

(58) Field of Classification Search
CPC ........ G01R 31/82; G01R 19/10; H02J 7/0047
See application file for complete search history.

(56) References Cited

U.S. PATENT DOCUMENTS

| 8,390,296 B2 | 3/2013 | Jung et al. |
| 2003/0102871 A1 | 6/2003 | Yudahira |

(Continued)

FOREIGN PATENT DOCUMENTS

| JP | 3311268 B2 | 8/2002 |
| JP | 2003168488 A | 6/2003 |

(Continued)

OTHER PUBLICATIONS

International Search Report for Application No. PCT/2021/000403, dated Apr. 29, 2021, 9 pages.

(Continued)

*Primary Examiner* — Matthew T Martin
*Assistant Examiner* — Ankith R Sripathi
(74) *Attorney, Agent, or Firm* — Lerner David LLP (57) ABSTRACT

A battery apparatus, including a plurality of battery packs including a first battery pack and a second battery pack connected in parallel, a plurality of current sensors including a first current sensor measuring a current of a first battery pack, a second current sensor measuring a current of the second battery pack, and a processing circuitry diagnosing the first current sensor and the second current sensor based on a first ratio between a current of the first battery pack and a current of the second battery pack that are calculated based on resistances or capacities of the plurality of battery packs, and a second ratio between the current of the first battery pack and the current of the second battery pack that are measured by the plurality of current sensors.

15 Claims, 4 Drawing Sheets

(51) Int. Cl.
  *H01M 10/48* (2006.01)
  *H01M 50/512* (2021.01)
  *H02J 7/00* (2006.01)

(56) References Cited

U.S. PATENT DOCUMENTS

| | | |
|---|---|---|
| 2011/0037476 A1 | 2/2011 | Jung et al. |
| 2017/0201103 A1 | 7/2017 | Jeon et al. |
| 2019/0120906 A1 | 4/2019 | Dan et al. |
| 2019/0195942 A1 | 6/2019 | Cheon |
| 2019/0195952 A1 | 6/2019 | Riley et al. |
| 2021/0033679 A1 | 2/2021 | Chang et al. |

FOREIGN PATENT DOCUMENTS

| | | | | |
|---|---|---|---|---|
| JP | 2007099033 | A | | 4/2007 |
| JP | 2013068452 | A | | 4/2013 |
| JP | 5299052 | B2 | | 9/2013 |
| JP | 5412891 | B2 | | 2/2014 |
| JP | 5812968 | B2 | | 11/2015 |
| JP | 2017225225 | A | | 12/2017 |
| JP | 2018197708 | A | | 12/2018 |
| JP | 2018200834 | A | | 12/2018 |
| KR | 101099811 | B1 | | 12/2011 |
| KR | 20130137389 | A | * 12/2013 | ....... G01R 19/16528 |
| KR | 20170084608 | A | | 7/2017 |
| KR | 101911184 | B1 | | 10/2018 |
| KR | 20190073066 | A | | 6/2019 |
| KR | 20190083915 | A | | 7/2019 |
| KR | 20200002016 | A | | 1/2020 |

OTHER PUBLICATIONS

Extended European Search Report for Application No. 21756453.3, dated Jul. 31, 2023, pp. 1-5.

* cited by examiner

BATTERY APPARATUS AND CURRENT SENSOR DIAGNOSIS METHOD

CROSS-REFERENCE TO RELATED APPLICATION

The present application is a national phase entry under 35 U.S.C. § 371 of International Application No. PCT/KR2021/000403 filed Jan. 12, 2021, published in Korean, which claims priority from Korean Patent Application No. 10-2020-0019229 filed in the Korean Intellectual Property Office on Feb. 17, 2020, all of which are incorporated herein by reference.

TECHNICAL FIELD

The described technology relates to a battery apparatus and a current sensor diagnosis method.

BACKGROUND ART

An electric vehicle is a vehicle that obtains power by driving a motor mainly using a battery as a power source. The electric vehicles are being actively researched because they are alternatives that can solve pollution and energy problems of internal combustion vehicles. In addition, rechargeable batteries are used in various electronic devices other than the electric vehicles. Such a battery is implemented in the form of a battery pack.

Recently, as a battery having high power and a large capacity is required, a battery in which a plurality of battery packs are connected in parallel is used. In addition, as the power and capacity increase, the potential risk of the battery is increasing, so the diagnosis function of the battery needs to be strengthened. Particularly, if an overcurrent flows in the battery pack and cannot be diagnosed, a problem may occur in an external apparatus due to the overcurrent.

For the diagnosis of overcurrent, a current sensor that measures the current output from the battery pack is used. If the accuracy of the current sensor is poor, the battery pack may measure the overcurrent as a normal current, so the overcurrent may not be diagnosed. In addition, if the current measured by the current sensor is different from an actual current, the vehicle may stop in the middle because the state of charge in the battery is incorrectly estimated and the required power cannot be supplied, or the battery may become unusable due to a sudden voltage drop.

SUMMARY

Technical Problem

Some embodiments may provide a battery apparatus and a current sensor diagnosis method for diagnosing an accuracy of a current sensor.

Technical Solution

According to one embodiment, a battery apparatus including a plurality of battery packs connected in parallel and comprising a first battery pack and a second battery pack; a plurality of current sensors comprising a first current sensor configured to measure a current of the first battery pack and a second current sensor configured to measure a current of the second battery pack; and a processing circuitry configured to diagnose the first current sensor and the second current sensor based on (i) a first ratio between a first calculated current of the first battery pack and a second calculated current of the second battery pack, wherein the first and second calculated currents are based on resistances or capacities of the plurality of battery packs, and (ii) a second ratio between the measured current of the first battery pack and the measured current of the second battery pack.

In some embodiments, the processing circuitry may be configured to calculate the first ratio based on the resistances of the plurality of battery packs in response to the battery apparatus being in a first state, and may be configured to calculate the first ratio based on the capacities of the plurality of battery packs in response to the battery apparatus being in a second state.

In some embodiments, currents of the plurality of battery packs are continuously applied when the battery apparatus is in the second state, and wherein currents of the plurality of battery packs are not continuously applied when the battery apparatus is in the first state.

In some embodiments, the first state may include a driving state of a mobility apparatus connected to the battery apparatus, and the second state may include a charging state of the battery apparatus.

In some embodiments, the processing circuitry may be configured to determine that the first current sensor and the second current sensor operate normally when a comparison of the first ratio to the second ratio satisfies a predetermined condition.

In some embodiments, the predetermined condition may include the second ratio being within an error tolerance range to the first ratio.

In some embodiments, the predetermined condition may include the second ratio being included between (i) a product of the first ratio and a first error tolerance coefficient and (ii) a product of the first ratio and a second error tolerance coefficient.

In some embodiments, the predetermined condition may include the first ratio being included between (i) a product of the second ratio and a first error tolerance coefficient and (ii) a product of the second ratio and a second error tolerance coefficient.

In some embodiments, the plurality of battery packs may further include a third battery pack, and the plurality of current sensors may further include a third current sensor configured to measure a current of the third battery pack.

In some embodiments, the processing circuitry may be configured to diagnose the third current sensor based on (iii) a third ratio between the first calculated current of the first battery pack and a third calculated current of the third battery pack, wherein the third calculated current is based on a resistance or a capacity of the third battery pack, and (iv) a fourth ratio between the measured current of the first battery pack and the measured current of the third battery pack.

According to another embodiment, a current sensor diagnosis method of a battery apparatus is provided. The battery apparatus includes a first battery pack and a second battery pack that are connected in parallel. The current sensor diagnosis method includes measuring, by a first current sensor, a first measured current of the first battery pack, measuring, by a second current sensor, a second measured current of the second battery pack, calculating, by a processing circuitry, a first ratio between a first calculated current of the first battery pack and a second calculated current of the second battery pack, wherein the first and second calculated currents are calculated based on a resistance of the first battery pack and a resistance of the second battery pack, respectively, calculating, by the processing circuitry, a second ratio between the first measured current of the first battery pack and the second measured current of the second battery pack, and diagnosing, by the processing circuitry, the first current sensor and the second current sensor based on the first ratio and a second ratio.

According to yet another embodiment, a current sensor diagnosis method of a battery apparatus is provided. The battery apparatus includes a first battery pack and a second battery pack that are connected in parallel. The current sensor diagnosis method includes measuring, by a first current sensor, a first measured current of the first battery pack, measuring, by a second current sensor, a second measured current of the second battery pack, calculating, by a processing circuitry, a first ratio between a first calculated current of the first battery pack and a second calculated current of the second battery pack, wherein the first and second calculated currents are calculated based on a capacity of the first battery pack and a capacity of the second battery pack, respectively, calculating, by the processing circuitry, a second ratio between the first measured current of the first battery pack and the second measured current of the second battery pack, and diagnosing, by the processing circuitry, the first current sensor and the second current sensor based on the first ratio and a second ratio.

Advantageous Effects

According to some embodiments, it is possible to diagnose a current sensor without adding a separate current sensor for measuring the accuracy of the current sensor. Accordingly, it is possible to prevent a problem that may occur due to a measurement error of the current sensor.

DETAILED DESCRIPTION

In the following detailed description, only certain embodiments have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

When it is described that an element is "connected" to another element, it should be understood that the element may be directly connected to the other element or connected to the other element through a third element. On the other hand, when it is described that an element is "directly connected" to another element, it should be understood that the element is connected to the other element through no third element.

As used herein, a singular form may be intended to include a plural form as well, unless the explicit expression such as "one" or "single" is used.

Figure 1:
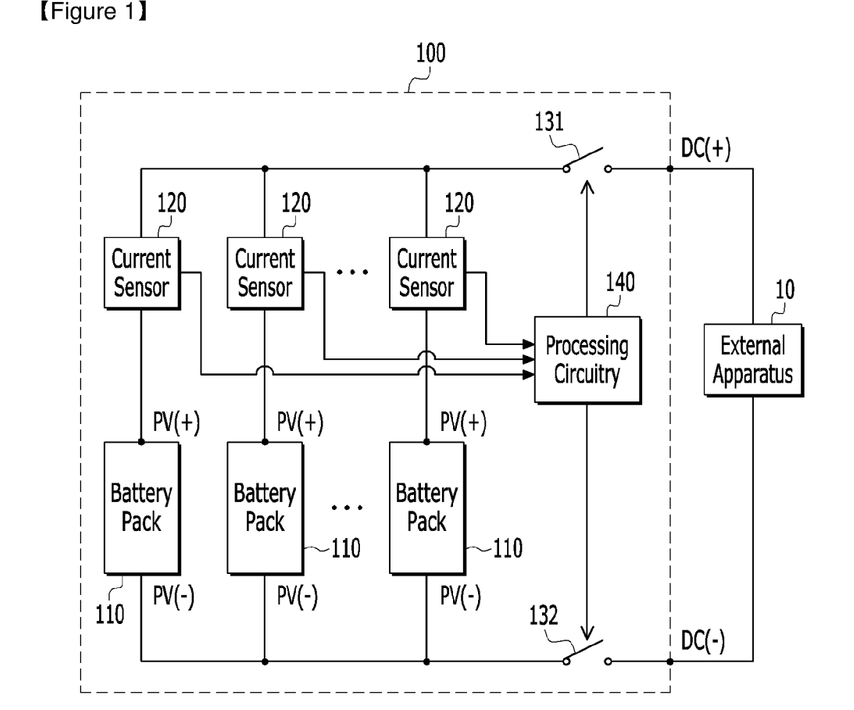
FIG. 1 is a drawing showing a battery apparatus according to an embodiment.

FIG. 1 is a drawing showing a battery apparatus according to an embodiment.

Referring to FIG. 1, a battery apparatus 100 has a structure that can be electrically connected to an external apparatus 10 through a positive link terminal DC(+) and a negative link terminal DC(−). When the external apparatus is a load, the battery apparatus 100 is discharged by operating as a power supply that supplies power to the load. The external apparatus 10 operating as the load may be, for example, an electronic device, a mobility apparatus, or an energy storage system (ESS). The mobility apparatus may be, for example, an electric vehicle, a hybrid vehicle, or a smart mobility.

The battery apparatus 100 includes a plurality of battery packs 110, a plurality of current sensors 120, a switch circuit 131 and 132, and a processing circuitry 140.

The plurality of battery packs 110 are connected in parallel. Each battery pack includes a plurality of battery cells (not shown) that are electrically connected, and has a positive output terminal PV(+) and a negative output terminal PV(−). In some embodiments, the battery cell may be a rechargeable battery. In some embodiments, each battery pack 110 may include a battery module in which a predetermined number of battery cells are connected in series. In some embodiments, a predetermined number of battery modules may be connected in series or in parallel in the battery pack 110 to supply desired power.

The plurality of current sensors 120 are provided to the plurality of battery packs 110, respectively. Each current sensor 120 is connected to an output terminal, for example, the positive output terminal PV(+) of the corresponding battery pack 110 and measures a current output from the corresponding battery pack 110.

The switch circuit includes a switch 131 that is connected between an output terminal, for example, the positive output terminal PV(+) of the plurality of battery pack 110 connected in parallel and a link terminal, for example, the positive link terminal DC(+) of the battery apparatus 100. In some embodiments, the switch circuit may further include a switch 133 that is connected between an output terminal, for example, the negative output terminal PV(−) of the plurality of battery pack 110 connected in parallel and a link terminal, for example, the negative link terminal DC(−) of the battery apparatus 100. The switch circuit may control electrical connection between the battery packs 110 and the external apparatus 10.

The processing circuitry 140 diagnoses an accuracy of the current sensors 120 based on currents measured by the current sensors 120. In some embodiments, the processing circuitry 140 may control operations of the switches 131 and 132 in the switch circuit.

In some embodiments, the battery apparatus 100 may further include a monitoring circuit. The monitoring circuit may monitor voltages of the battery packs 110 and additionally monitor temperatures of the battery packs 110. In some embodiments, a plurality of monitoring circuits corresponding to the plurality of battery packs 110 respectively may be provided.

In some embodiments, the processing circuitry 140 may be a circuitry including a processor, and the processor may be, for example, a micro controller unit (MCU).

In some embodiments, the processing circuitry 140 may be included in a battery management system (BMS).

In some embodiments, the switches 131 and 132 may be relays or transistors.

Hereinafter, a method of diagnosing an accuracy of current sensors in a battery apparatus according to various embodiments is described with reference to FIG. 2 to FIG. 4.

Figure 2:
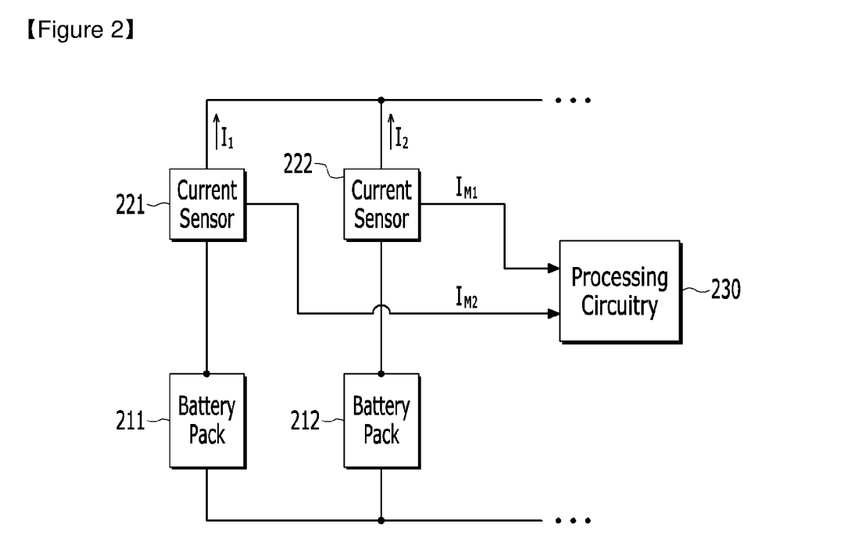
FIG. 2 is a drawing explaining a current sensor diagnosis method according to an embodiment.

FIG. 2 is a drawing explaining a current sensor diagnosis method according to an embodiment. In FIG. 2, for convenience of explanation, the number of battery packs 211 and 212 connected in parallel is assumed to be two, but is not limited thereto.

Referring to FIG. 2, a current sensor 221 is connected to the battery pack 211, and a current sensor 222 is connected to the battery pack 212. A processing circuitry 230 receives a current of the battery pack 211 measured by the current sensor 221 and a current of the battery pack 212 measured by the current sensor 222 to diagnose the current sensors 221 and 222.

In the plurality of battery packs connected in parallel, a current of each battery pack is inversely proportional to a resistance of a corresponding battery pack, and is proportional to a capacity of the corresponding battery pack. In each battery pack, since the resistance and capacity of the corresponding battery pack correspond to specifications, the processing circuitry 230 may store the resistance and capacity of each battery pack. Therefore, the processing circuitry 230 may estimate the current of each battery pack based on the resistance or capacity of each battery pack.

Assuming that the entire current flowing through the plurality of battery packs 211 and 212 is $I_t$, the current flowing through each battery pack may be determined by the resistances or capacities of the battery packs 211 and 212 connected in parallel. In one embodiment, when the current is determined by the resistances of the battery packs 211 and 212, the current flowing through each battery pack may be determined as in Equation 1. In another embodiment, when the current is determined by the capacities of the battery packs 211 and 212, the current flowing through each battery pack may be determined as in Equation 2.

$$I_1 = \frac{R_2}{R_1 + R_2} I_t \quad \text{Equation 1}$$
$$I_2 = \frac{R_1}{R_1 + R_2} I_t$$

Here, $I_1$ denotes the current flowing through the battery pack 211, $I_2$ denotes the current flowing through the battery pack 212, $R_1$ denotes the resistance of the battery pack 211, and $R_2$ denotes the resistance of the battery pack 212.

$$I_1 = \frac{C_2}{C_1 + C_2} I_t \quad \text{Equation 2}$$
$$I_2 = \frac{C_1}{C_1 + C_2} I_t$$

Therefore, the processing circuitry 230 may diagnose the current sensors 221 and 222 based on the currents calculated by Equation 1 or 2 and the currents measured by the current sensors 221, and 222.

Figure 3:
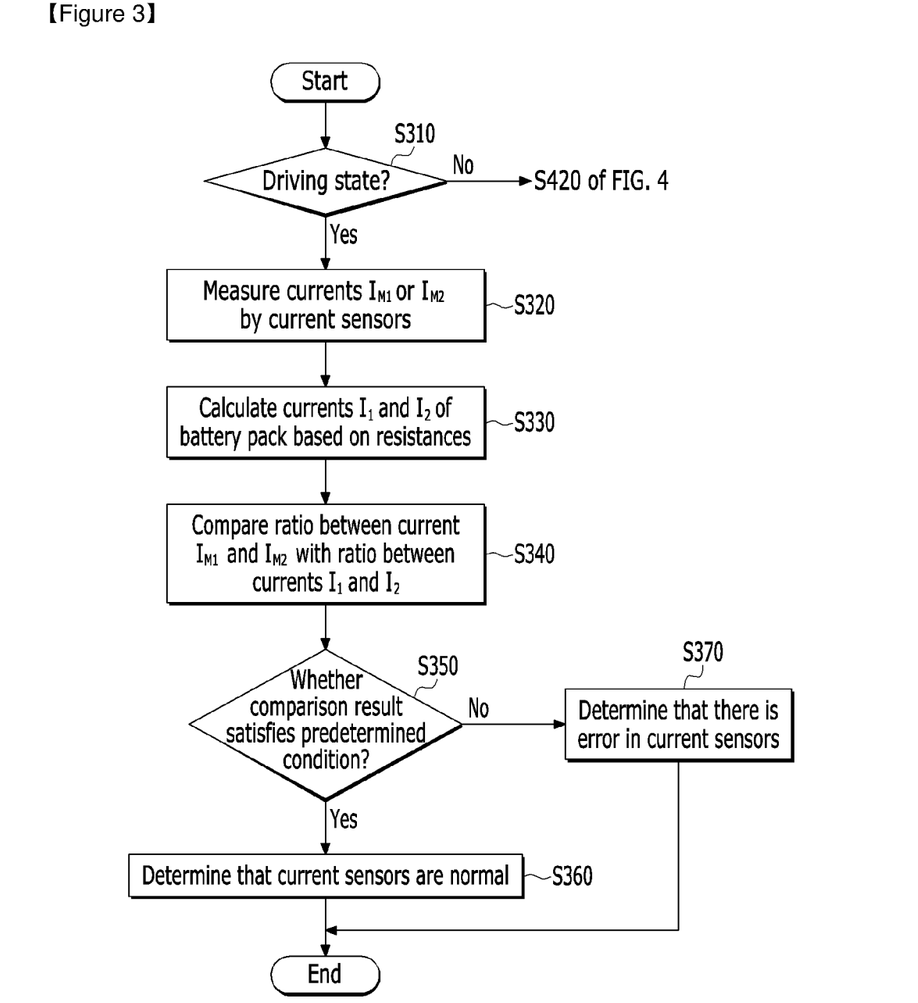
FIG. 3 is a flowchart showing a diagnosis method of a current sensor according to an embodiment.

FIG. 3 is a flowchart showing a diagnosis method of a current sensor according to an embodiment.

Referring to FIG. 3, each current sensor (e.g., 221 or 222 of FIG. 2) measures a current $I_{M1}$ or $I_{M2}$ of a corresponding battery pack (211 or 212 of FIG. 2) at operation S320. In some embodiments, a switch (e.g., 131 and 132 of FIG. 1) connecting the battery pack 110 and the external apparatus 10 may be turned on by control of a processing circuitry (230 of FIG. 2). Accordingly, a current flows between the battery packs (e.g., 211 and 212) and the external apparatus (e.g., 10 of FIG. 1), and the current sensors 221, and 222 can measure the currents flowing through corresponding battery packs 211 and 212, respectively.

In addition, the processing circuitry 230 calculates the currents $I_1$ and $I_2$ flowing through the battery pack 211 and 212 based on resistances of the battery packs 211 and 212, respectively, at operation S330. In some embodiments, the processing circuitry 230 may calculate the currents $I_1$ and $I_2$ flowing through the battery pack 211 and 212, respectively, as in Equation 1.

Next, the processing circuitry 230 compares a ratio between the current $I_{M1}$ and $I_{M2}$ of the battery packs measured by the current sensors 221 and 222 with a ratio between the currents $I_1$ and $I_2$ of the battery packs calculated based on the resistances at operation S340. When the comparison result satisfies a predetermined condition at operation S350, the processing circuitry 230 determines that the current sensors 221 and 222 are normal at operation S360. When the comparison result does not satisfy the predetermined condition at operation S350, the processing circuitry 230 determines that there is a problem in the accuracy of the current sensors 221 and 222 at operation S370. That is, the processing circuitry 230 may determine that there is an error in the current sensors 221 and 222.

In some embodiments, the processing circuitry 230 may determine that the current sensors 221 and 222 are normal when the ratio between the currents $I_{M1}$ and $I_{M2}$ of the battery packs is within an error tolerance range of the ratio between the calculated currents $I_1$ and $I_2$ of the battery packs as in Equation 3 or 4. As shown in Equations 3 and 4, the ratio between the two currents $I_1$ and $I_2$ may be calculated as a ratio between the resistances $R_2$ and $R_1$.

$$k_1 \cdot \frac{R_2}{R_1} = k_1 \cdot \frac{I_1}{I_2} < \frac{I_{M1}}{I_{M2}} < k_2 \cdot \frac{I_1}{I_2} = k_2 \cdot \frac{R_2}{R_1} \quad \text{Equation 3}$$

$$k_3 \cdot \frac{R_1}{R_2} = k_3 \cdot \frac{I_2}{I_1} < \frac{I_{M2}}{I_{M1}} < k_4 \cdot \frac{I_2}{I_1} = k_4 \cdot \frac{R_1}{R_2} \quad \text{Equation 4}$$

Here, $k_1$, $k_2$, $k_3$, and $k_4$ denote error tolerance coefficients and may be set based on a current measurement error of that can be tolerated in the battery apparatus 100.

In some embodiments, when determining whether the ratio between the currents $I_{M1}$ and $I_{M2}$ of the battery packs is within the error tolerance range of the ratio between the calculated currents $I_1$ and $I_2$ of the battery packs, the processing circuitry 230 may multiply the ratio between the current $I_{M1}$ and $I_{M2}$ of the battery packs measured by the current sensors by the error tolerance coefficients, as in Equation 5 or 6.

$$k_5 \cdot \frac{I_{M1}}{I_{M2}} < \frac{I_1}{I_2} = \frac{R_2}{R_1} < k_6 \cdot \frac{I_{M1}}{I_{M2}} \quad \text{Equation 5}$$

$$k_7 \cdot \frac{I_{M2}}{I_{M1}} < \frac{I_2}{I_1} = \frac{R_1}{R_2} < k_8 \cdot \frac{I_{M2}}{I_{M1}} \quad \text{Equation 6}$$

Here, $k_5$, $k_6$, $k_7$, and $k_8$ denote error tolerance coefficients and may be set based on a current measurement error of that can be tolerated in the battery apparatus 100.

In one embodiment, when the number of battery packs is three or more, the currents may be compared for all combinations of two battery packs. In another embodiment, one battery pack may be set as a reference battery pack, and the currents may be compared between the reference battery pack and other battery pack. In yet another embodiment, the currents may be compared between two adjacent battery packs.

According to embodiments described above, it is possible to diagnose the current sensors 221 and 222 without adding a separate current sensor for measuring the accuracy of the current sensors 221 and 222. Accordingly, it is possible to prevent a problem that may occur due to a measurement error of the current sensors.

In some embodiments, before calculating the currents of the battery packs 211 and 212 based on the resistances of the battery packs 211 and 212, the processing circuitry 230 may first determine a state of the battery apparatus at operation S310. In one embodiment, when the state of the battery apparatus is a state in which the current continuously changes as the current is supplied to an external apparatus, the processing circuitry 230 may determine that the currents of the battery pack 211 and 212 are calculated based on the resistances of the battery packs 211 and 212. For example, such a state may be a state in which the external apparatus is a mobility apparatus and the mobility apparatus is driving. When the state of the battery apparatus is a state in which the current is continuously applied relatively compared to the driving state, the processing circuitry 230 may calculate the currents of the battery packs 211 and 212 in a different manner. In some embodiments, such a method may include a method of using capacities of the battery pack 211 and 212 to be described with reference to FIG. 4.

According to embodiments, the current sensors 221 and 222 can be accurately diagnosed by changing the method of calculating the currents of the battery packs 211 and 212 according to the state of the battery apparatus.

Figure 4:
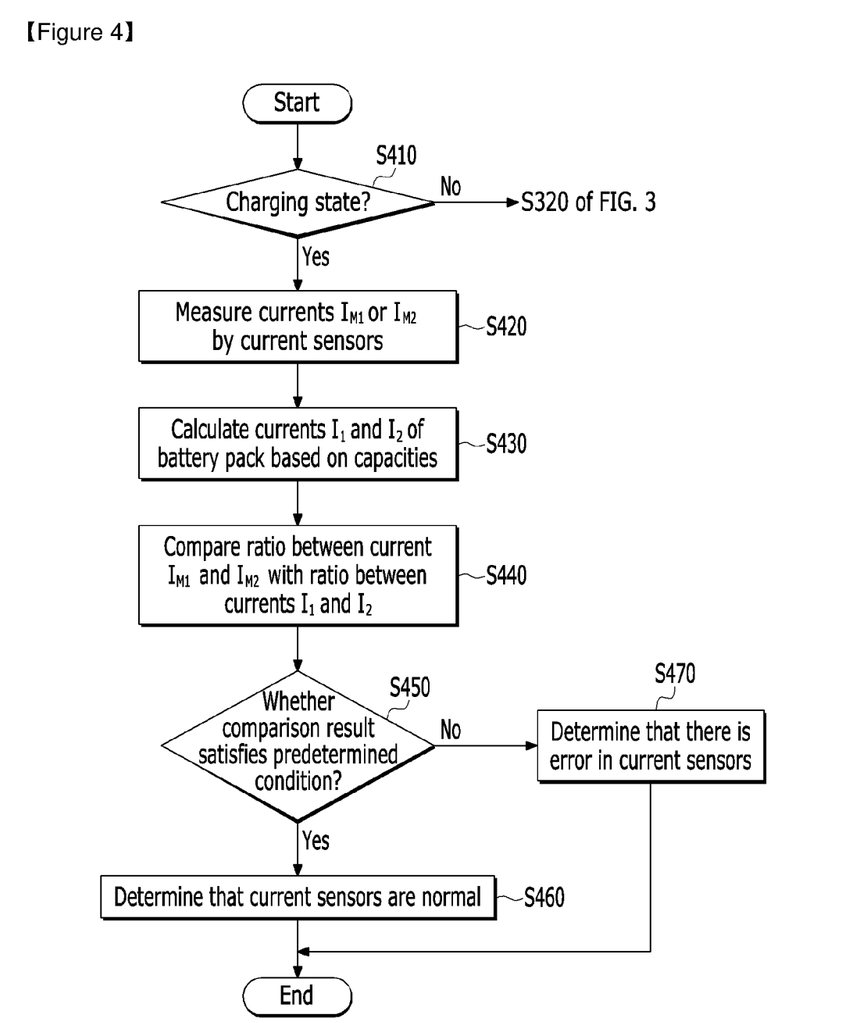
FIG. 4 is a flowchart showing a diagnosis method of a current sensor according to another embodiment.

FIG. 4 is a flowchart showing a diagnosis method of a current sensor according to another embodiment.

Referring to FIG. 4, each current sensor (e.g., 221 or 222 of FIG. 2) measures a current $I_{M1}$ or $I_{M2}$ of a corresponding battery pack (211 or 212 of FIG. 2) at operation S420. In some embodiments, a switch (e.g., 131 and 132 of FIG. 1) connecting the battery pack 110 and the external apparatus 10 may be turned on by control of a processing circuitry (230 of FIG. 2). Accordingly, a current flows between the battery packs (e.g., 211 and 212) and the external apparatus (e.g., 10 of FIG. 1), and the current sensors 221 and 222 can measure the currents flowing through corresponding battery packs 211 and 212, respectively.

In addition, the processing circuitry 230 calculates the currents $I_1$ and $I_2$ flowing through the battery pack 211 and 212 based on capacities of the battery packs 211 and 212, respectively, at operation S430. In some embodiments, the processing circuitry 230 may calculate the currents $I_1$ and $I_2$ flowing through the battery pack 211 and 212, respectively, as in Equation 2.

Next, the processing circuitry 230 compares a ratio between the current $I_{M1}$ and $I_{M2}$ of the battery packs measured by the current sensors 221 and 222 with a ratio between the currents $I_1$ and $I_2$ of the battery packs calculated based on the capacities at operation S440. When the comparison result satisfies a predetermined condition at operation S450, the processing circuitry 230 determines that the current sensors 221 and 222 are normal at operation S460. When the comparison result does not satisfy the predetermined condition at operation S450, the processing circuitry 230 determines that there is a problem in the accuracy of the current sensors 221 and 222 at operation S470. That is, the processing circuitry 230 may determine that there is an error in the current sensors 221 and 222.

In some embodiments, the processing circuitry 230 may determine that the current sensors 221 and 222 are normal when the ratio between the currents $I_{M1}$ and $I_{M2}$ of the battery packs is within an error tolerance range of the ratio between the calculated currents $I_1$ and $I_2$ of the battery packs as in Equation 7 or 8. As shown in Equations 3 and 4, the ratio between the two currents $I_1$ and $I_2$ may be calculated as a ratio between the resistances $C_2$ and $C_1$.

$$k_1 \cdot \frac{C_2}{C_1} = k_1 \cdot \frac{I_1}{I_2} < \frac{I_{M1}}{I_{M2}} < k_2 \cdot \frac{I_1}{I_2} = k_2 \cdot \frac{C_2}{C_1} \qquad \text{Equation 7}$$

$$k_3 \cdot \frac{C_1}{C_2} = k_3 \cdot \frac{I_2}{I_1} < \frac{I_{M2}}{I_{M1}} < k_4 \cdot \frac{I_2}{I_1} = k_4 \cdot \frac{C_1}{C_2} \qquad \text{Equation 8}$$

Here, $k_1$, $k_2$, $k_3$, and $k_4$ denote error tolerance coefficients and may be set based on a current measurement error of that can be tolerated in the battery apparatus 100.

In some embodiments, when determining whether the ratio between the currents $I_{M1}$ and $I_{M2}$ of the battery packs is within the error tolerance range of the ratio between the calculated currents $I_1$ and $I_2$ of the battery packs, the processing circuitry 230 may multiply the ratio between the current $I_{M1}$ and $I_{M2}$ of the battery packs measured by the current sensors by the error tolerance coefficients, as in Equation 9 or 10.

$$k_5 \cdot \frac{I_{M1}}{I_{M2}} < \frac{I_1}{I_2} = \frac{C_2}{C_1} < k_6 \cdot \frac{I_{M1}}{I_{M2}} \qquad \text{Equation 9}$$

$$k_7 \cdot \frac{I_{M2}}{I_{M1}} < \frac{I_2}{I_1} = \frac{C_1}{C_2} < k_8 \cdot \frac{I_{M2}}{I_{M1}} \qquad \text{Equation 10}$$

Here, $k_5$, $k_6$, $k_7$, and $k_8$ denote error tolerance coefficients and may be set based on a current measurement error of that can be tolerated in the battery apparatus 100.

In one embodiment, when the number of battery packs is three or more, the currents may be compared for all combinations of two battery packs. In another embodiment, one battery pack may be set as a reference battery pack, and the currents may be compared between the reference battery pack and other battery pack. In yet another embodiment, the currents may be compared between two adjacent battery packs.

According to embodiments described above, it is possible to diagnose the current sensors 221 and 222 without adding a separate current sensor for measuring the accuracy of the current sensors 221 and 222. Accordingly, it is possible to prevent a problem that may occur due to a measurement error of the current sensors.

In some embodiments, before calculating the currents of the battery packs 211 and 212 based on the capacities of the battery packs 211 and 212, the processing circuitry 230 may first determine a state of the battery apparatus at operation S410. In one embodiment, when the state of the battery apparatus is a state in which the current is continuously applied relatively compared to a driving state, the processing circuitry 230 may determine that the currents of the battery pack 211 and 212 are calculated based on the capacities of the battery packs 211 and 212. For example, such a state may be a charging state of the battery apparatus. Meanwhile, when the state of the battery apparatus is a state in which the current continuously changes, the processing circuitry 230 may calculate the currents of the battery packs 211 and 212 in a different manner. In some embodiments, such a method may include a method of using resistances of the battery pack 211 and 212 described with reference to FIG. 3.

According to embodiments, the current sensors 221 and 222 can be accurately diagnosed by changing the method of calculating the currents of the battery packs 211 and 212 according to the state of the battery apparatus.

While various embodiments have been described, it is to be understood that the invention is not limited to the disclosed embodiments. On the contrary, it is intended to cover various modifications and equivalent arrangements included within the spirit and scope of the appended claims.

The invention claimed is:

1. A battery apparatus comprising:
   a plurality of battery packs connected in parallel and comprising a first battery pack and a second battery pack;
   a plurality of current sensors comprising a first current sensor configured to measure a first measured current of the first battery pack and a second current sensor configured to measure a second measured current of the second battery pack; and
   a processing circuitry configured to:
   (i) calculate a first calculated current of the first battery pack based on a resistance or a capacity of the first battery pack,
   (ii) calculate a second calculated current of the second battery pack based on a resistance or a capacity of the second battery pack,
   (iii) determine a first ratio that is equal to the first calculated current divided by the second calculated current,
   (iv) obtain the first measured current of the first battery pack from the first current sensor
   (v) obtain the second measured current of the second battery pack from the second current sensor,
   (v) calculate a second ratio that is equal to the first measured current divided by the second measured current, and
   (vi) diagnose the first current sensor and the second current sensor based on the first ratio and the second ratio.

2. The battery apparatus of claim 1, wherein the processing circuitry is configured to calculate the first ratio based on the resistances of the plurality of battery packs in response to the battery apparatus being in a first state, and to calculate the first ratio based on the capacities of the plurality of battery packs in response to the battery apparatus being in a second state.

3. The battery apparatus of claim 2, wherein currents of the plurality of battery packs are continuously applied when the battery apparatus is in the second state, and wherein currents of the plurality of battery packs are not continuously applied when the battery apparatus is in the first state.

4. The battery apparatus of claim 2, wherein the first state comprises a driving state of a mobility apparatus connected to the battery apparatus, and
   wherein the second state comprises a charging state of the battery apparatus.

5. The battery apparatus of claim 1, wherein the processing circuitry is configured to determine that the first current sensor and the second current sensor operate normally when a comparison of the first ratio and the second ratio satisfies a predetermined condition.

6. The battery apparatus of claim 5, wherein the predetermined condition comprises the second ratio being within an error tolerance range to the first ratio.

7. The battery apparatus of claim 5, wherein the predetermined condition comprises the second ratio being included between (i) a product of the first ratio and a first error tolerance coefficient and (ii) a product of the first ratio and a second error tolerance coefficient.

8. The battery apparatus of claim 5, wherein the predetermined condition comprises the first ratio being included between (i) a product of the second ratio and a first error tolerance coefficient and (ii) a product of the second ratio and a second error tolerance coefficient.

9. The battery apparatus of claim 1, wherein the plurality of battery packs further comprise a third battery pack, and the plurality of current sensors further comprise a third current sensor configured to measure a third measured current of the third battery pack, and
   wherein the processing circuitry is configured to diagnose the third current sensor based on (iii) a third ratio between the first calculated current of the first battery pack and a third calculated current of the third battery pack, wherein the third calculated current is based on a resistance or a capacity of the third battery pack, and (iv) a fourth ratio between the first measured current of the first battery pack and the third measured current of the third battery pack.

10. A current sensor diagnosis method of a battery apparatus comprising a first battery pack and a second battery pack that are connected in parallel, the method comprising:
    measuring, by a first current sensor, a first measured current of the first battery pack;
    measuring, by a second current sensor, a second measured current of the second battery pack;
    calculating, by a processing circuitry, a first calculated current of the first battery pack based on a resistance of the first battery pack;
    calculating, by the processing circuitry, a second calculated current of the second battery pack based on a resistance of the second battery pack, respectively;
    determining, by the processing circuitry, a first ratio that is equal to the first calculated current divided by the second calculated current;
    obtaining, by the processing circuitry, the first measured current of the first battery pack from the first current sensor;
    obtaining, by the processing circuitry, the second measured current of the second battery pack from the second current sensor; and
    calculating, by the processing circuitry, a second ratio that is equal to the first measured current divided by the second measured current; and
    diagnosing, by the processing circuitry, the first current sensor and the second current sensor based on the first ratio and the second ratio.

11. The method of claim 10, wherein diagnosing the first current sensor and the second current sensor comprises determining that the first current sensor and the second current sensor operate normally when a comparison of the first ratio and the second ratio satisfies a predetermined condition.

12. The method of claim 11, wherein the predetermined condition comprises the second ratio being within an error tolerance range to the first ratio.

13. A current sensor diagnosis method of a battery apparatus comprising a first battery pack and a second battery pack that are connected in parallel, the method comprising:

measuring, by a first current sensor, a first measured current of the first battery pack;

measuring, by a second current sensor, a second measured current of the second battery pack;

calculating, by a processing circuitry, a first calculated current of the first battery pack based on a capacity of the first battery pack;

calculating, by the processing circuitry, a second calculated current of the second battery pack based on a capacity of the second battery pack, respectively;

determining, by the processing circuitry, a first ratio that is equal to the first calculated current divided by the second calculated current;

obtaining, by the processing circuitry, the first measured current of the first battery pack from the first current sensor;

obtaining, by the processing circuitry, the second measured current of the second battery pack from the second current sensor; and calculating, by the processing circuitry, a second ratio that is equal to the first measured current divided by the second measured current; and diagnosing, by the processing circuitry, the first current sensor and the second current sensor based on the first ratio and the second ratio.

14. The method of claim 13, wherein diagnosing the first current sensor and the second current sensor comprises determining that the first current sensor and the second current sensor operate normally when a comparison of the first ratio and the second ratio satisfies a predetermined condition.

15. The method of claim 14, wherein the predetermined condition comprises the second ratio being within an error tolerance range to the first ratio.

* * * * *